April 7, 1931.　　　L. T. FREDERICK　　　1,799,506
METHOD OF MAKING COMPOSITE MATERIAL
Filed Dec. 23, 1926
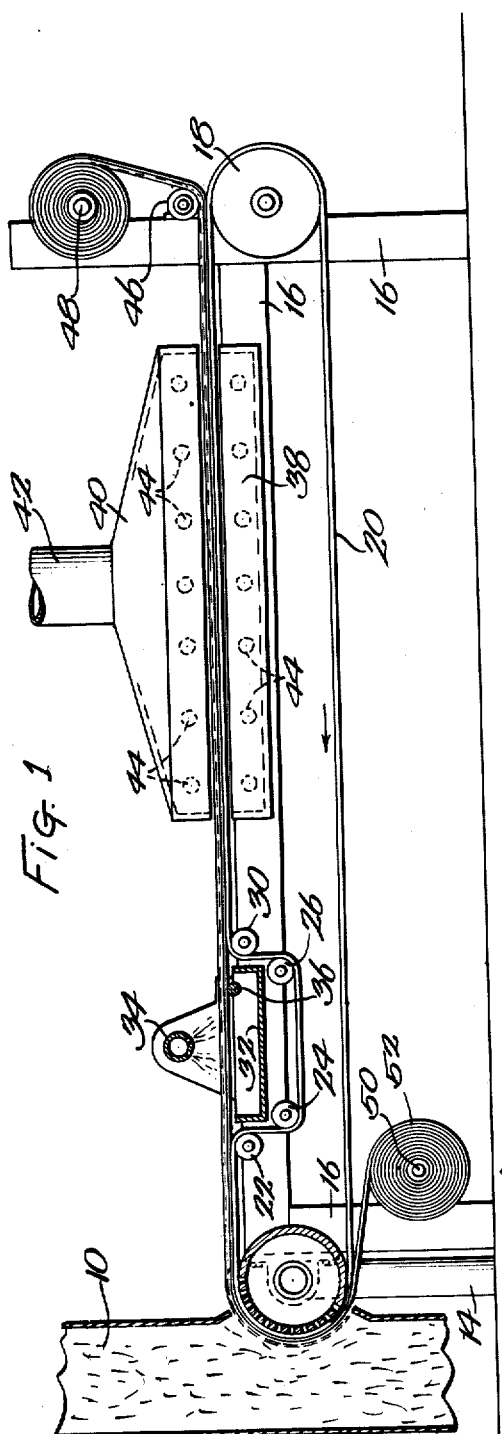
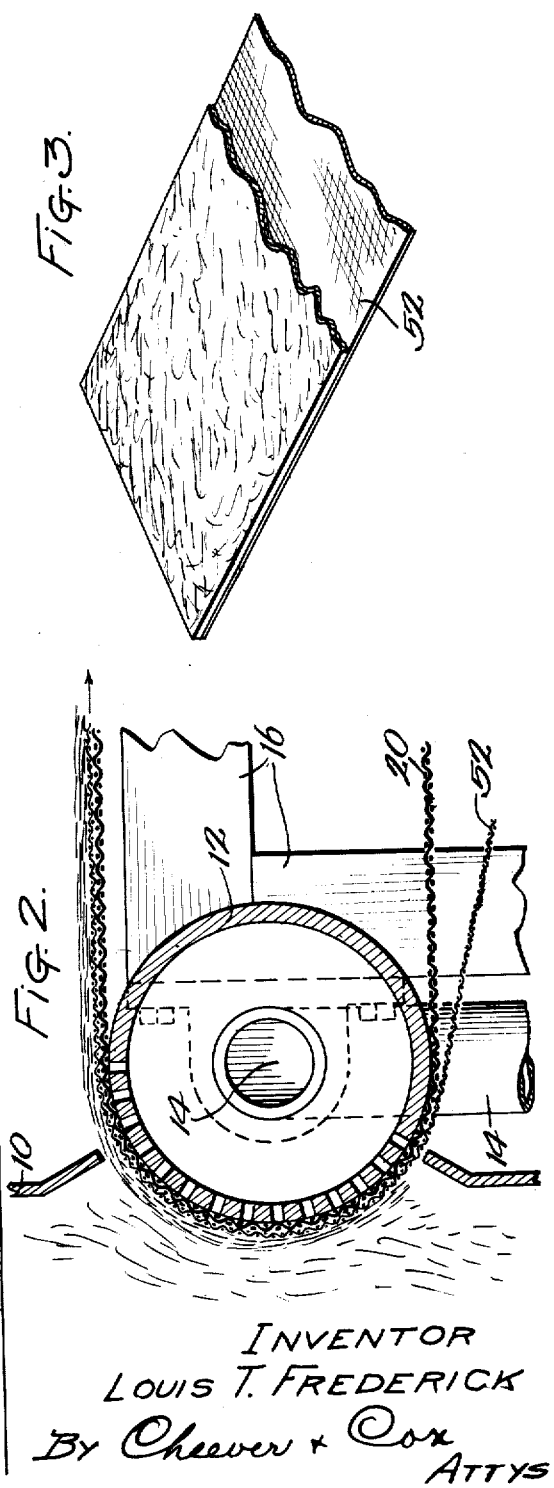
INVENTOR
LOUIS T. FREDERICK
By Cheever + Cox
ATTYS Patented Apr. 7, 1931

1,799,506

UNITED STATES PATENT OFFICE

LOUIS T. FREDERICK, OF VALPARAISO, INDIANA, ASSIGNOR TO FIBROC INSULATION COMPANY, OF VALPARAISO, INDIANA, A CORPORATION OF INDIANA

METHOD OF MAKING COMPOSITE MATERIAL

Application filed December 23, 1926. Serial No. 156,630.

My invention relates to methods for producing composite material including particularly a composition of fibrous material and reaction product such as Bakelite. My present invention contemplates more particularly the production of dry sheets or strips in which the reaction product is in unreacted condition so that the resulting sheets may be arranged in layers to produce plates, boards, gear blanks and the like when subjected to heat and pressure, or may be comminuted or shredded to produce molding material. In addition to the general purpose of the machine and method it is my object to make it possible to utilize scraps of fibrous material consisting frequently of by-products or waste products from other industries. For example, in the manufacture of shoes considerable quantities of scraps of canvas and duck are produced, and the same is true in connection with the clothing trade and in trades using cotton waste, paper stock and other fibrous materials. Another object is to produce a sheet of uniform texture and quality. Kindred objects will become apparent as the description proceeds.

In Figure 1 of the accompanying drawings I have illustrated a machine embodying one phase of the invention.

Figure 2 is an enlarged vertical section of a portion of the machine at the left of Figure 1.

Figure 3 is a fragmentary perspective illustrating one form of product.

Like numerals denote like parts throughout the several views.

In the form selected to illustrate the invention there is a vertical chute or tower 10 having an opening in the side adjacent to which there is a stationary drum 12. The drum approximately fills the opening and is foraminated at that portion facing the inside of the tower and extending to the upper part of the drum. Air is constantly withdrawn from the drum through a duct 14 and thus air is constantly being sucked into the drum from the tower and the upper portion of the drum. The drum is mounted upon a suitable framework or table 16. At the opposite end of said framework is a pulley 18 which rotates constantly when the machine is in use and serves to cause an endless screen belt 20 to travel around drum 12 and pulley 18. The screen belt is of course pervious to air, and hence permits the air to be drawn through it from the tower. In the special construction shown the upper run of the screen belt is not completely horizontal but passes over a guide roller 22 located not far from drum 14; thence under a guide roller 24; thence under and up around a guide roller 26 located at a short distance from the roller 24; thence up and around a guide roller 30 which is on the same level as roller 22 and at a relatively short distance from it, for example a foot or two. Between the rollers 22 and 30 there is a drip pan 32 for collecting any drippings from the spray pipe 34 whose function is to spray the binder upon the work strip as the latter passes beneath it. The binder ordinarily consists of a solution of a reaction product such as Bakelite, that is, a phenol formaldehyde condensation or reaction product, whose characteristic is to harden under the action of heat and pressure.

It is desirable to place a stripper rod 36 beneath the work strip at the far end of the pan 32 as illustrated in Figure 1.

At a point beyond the spray apparatus just described there is a dryer consisting in the present case of a casing 38 located below the upper run of the screen belt 20 and a hood or casing 40 located above it. The latter is equipped with a flue or uptake 42 for removing the fumes and moisture. Inside of this heater are heating elements 44 which may be electric resistant units, gas heaters, steam coils or other known heating means.

Located at the far end of the machine remote from the tower there is a guide roller 46 and a takeup reel 48. At the head end of the machine below the lower run of screen belt 20 is a storage reel 50.

Now to describe the method which may be carried out mechanically by means of the apparatus shown and described: A supply of fabric in the form of a roll 52 is placed upon the supply reel 50 and the strip led thence around the inner end of drum 12; thence over the top of it outside of the screen belt 20 directly to the guide roller 46. Thus in the form illustrated the fabric strip 50 does not follow the screen belt at all points but is separate therefrom in the neighborhood of the drip pan 32. When the machine is ready for operation particles of the work material are dropped down through tower 10. As above indicated these consist of small particles of fibrous material such as small pieces of canvas, duck, linen fabric, paper, cotton waste or lint. As they approach the neighborhood of drum 12 they are induced by suction to float toward it and pile themselves upon the air pervious strip 52 overlying the screen belt 20. They become felted or matted upon this foundation strip to a thickness depending upon various factors such as the rate at which the belt is traveling, the intensity of the suction and the density of the falling column of particles within tower 10.

Until the particles arrive at approximately the top of drum 12 they are held in position by suction. Thereafter as the belt starts on its horizontal run the felted material will remain on it simply under the action of gravity. Soon after the work material has left the drum it comes beneath the sprinkler 34 which applies a solution of the binding material. The work strip is of course porous and the motion comparatively slow, and it is desirable to thoroughly impregnate the work material. Therefore it is desirable to apply a surplus of the binder, and this surplus drips through into pan 32, the remnant being stripped off by the stripper rod 36 as the work material finally leaves the pan.

Thereafter the work strip passes through the dryer 38, 40 where the solvent is removed from the binder, thus causing the work strip to issue from the dryer in dry condition thoroughly impregnated with the binder. The strip is then rolled up on the takeup reel 48.

When the binder is of the phenol condensation product type, the product produced by my machine and method may be used in various known ways, for example, it may be cut up into sheets, the sheets piled one upon another and the pile subjected to heat and pressure to produce a so-called "laminated" product; or the product of my machine and method may be ground, chopped up or shredded to produce a molding material, which may be introduced into molds and there subjected to heat and pressure to produce various mechanical elements. One of the chief advantages of my invention, however, is that it makes it possible to produce a truly laminated product from small scraps of fibrous material, and it is known by those familiar with the art that a laminated product is stronger as a rule than a product composed of small particles of fibrous material irregularly arranged and held together by the reacted binder. My invention makes it possible to produce actual sheets of material treated with unreacted binder ready for introduction into the hot press in which the reaction takes place and the sheets are consolidated and rendered insoluble and infusible in the form of a so-called laminated product. It will be observed that the backing strip 52 remains with the rest of the product; in fact it becomes a part thereof because where thin and loosely woven fabric like cheesecloth is employed as the backing strip the air suction actually draws some of the fibers into the meshes of the cheesecloth so that to a certain extent they become incorporated therewith, an effect which is usually enhanced to a certain extent by the binder which drips through and tends to carry any loose fibers with it down through the cheesecloth. The result is that a unified product results and the final strip or sheet may be handled as a unitary article.

I do not herein claim the machine for accomplishing the novel process of my present invention, the same forming the subject matter of my co-pending application, Serial Number 262,401, filed March 17th, 1928; and I do not claim herein the material formed through the practice of the method of my present invention, since the same forms the subject matter of my co-pending application, Serial No. 176,416, filed March 18, 1927.

Having thus described my invention, what I claim as new and desire to secure by Letters Patent is:—

1. The method of making a composite material of the heat curable type which consists in forming a cloud of fibrous particles, moving an air pervious backing strip adjacent the cloud, creating pneumatic suction behind the backing strip to draw the particles onto the backing strip in felted relationship, thereafter saturating the felted material and the backing strip with a solution of a suitable heat curable binder and finally drying the saturated material in order to drive off the binder solution to produce a composite sheet of material capable of being molded by heat and pressure.

2. The method of making composite material which consists in forming a cloud of fibrous particles, moving an air pervious backing strip adjacent the cloud of particles, creating a draft of air through the backing strip to draw fibrous particles from the cloud and packing them upon the backing strip in felted relationship, and thereafter treating the backing strip and the material felted thereon with a suitable binder to produce a composite sheet of material in a continuous manner.

3. The method of making composite material which consists in piling fibrous particles in felted relationship upon an air pervious backing strip by means of suction operating through the backing strip to form a composite sheet comprising the backing strip and the particles felted thereon and by finally applying a suitable resin to the composite sheet.

4. The method of making composite material which consists in piling fibrous particles in felted relationship upon an air pervious backing strip by means of suction operating through the backing strip to form a composite sheet comprising the backing and the particles felted thereon.

5. The method of making composite material, which consists in felting fibrous particles into the interstices of an air pervious backing strip by means of a current of air operating through the backing strip to form a composite sheet comprising the backing strip and the particles felted thereon.

6. The method of making composite material, which consists in felting fibrous particles into the interstices of an air pervious backing strip to form a composite sheet comprising the backing strip and the particles felted thereon.

In witness whereof, I have hereunto subscribed my name.

LOUIS T. FREDERICK.

a composite sheet comprising the backing strip and the particles felted thereon and by finally applying a suitable resin to the composite sheet.

4. The method of making composite material which consists in piling fibrous particles in felted relationship upon an air pervious backing strip by means of suction operating through the backing strip to form a composite sheet comprising the backing and the particles felted thereon.

5. The method of making composite material, which consists in felting fibrous particles into the interstices of an air pervious backing strip by means of a current of air operating through the backing strip to form a composite sheet comprising the backing strip and the particles felted thereon.

6. The method of making composite material, which consists in felting fibrous particles into the interstices of an air pervious backing strip to form a composite sheet comprising the backing strip and the particles felted thereon.

In witness whereof, I have hereunto subscribed my name.

LOUIS T. FREDERICK.

---

CERTIFICATE OF CORRECTION.

Patent No. 1,799,506.                                   Granted April 7, 1931, to

LOUIS T. FREDERICK.

It is hereby certified that the above numbered patent was erroneously issued to "Fibroc Insulation Company, of Valparaiso, Indiana, a corporation of Indiana", as assignee of the entire interest in said invention, whereas said patent should have been issued to the Continental Diamond Fibre Company, of Newark, Delaware, a corporation of Delaware, as shown by the records of assignments in this office; and that the said Letters Patent should be read with this correction therein that the same may conform to the record of the case in the Patent Office.

Signed and sealed this 28th day of April, A. D. 1931.

(Seal)

M. J. Moore,
Acting Commissioner of Patents.

CERTIFICATE OF CORRECTION.

Patent No. 1,799,506.                                              Granted April 7, 1931, to

LOUIS T. FREDERICK.

It is hereby certified that the above numbered patent was erroneously issued to "Fibroc Insulation Company, of Valparaiso, Indiana, a corporation of Indiana", as assignee of the entire interest in said invention, whereas said patent should have been issued to the Continental Diamond Fibre Company, of Newark, Delaware, a corporation of Delaware, as shown by the records of assignments in this office; and that the said Letters Patent should be read with this correction therein that the same may conform to the record of the case in the Patent Office.

Signed and sealed this 28th day of April, A. D. 1931.

(Seal)                                                                        M. J. Moore,
                                                                            Acting Commissioner of Patents.